. United States Patent [19]

Spietschka et al.

[11] Patent Number: 4,758,665
[45] Date of Patent: Jul. 19, 1988

[54] PROCESS FOR PREPARING HIGH-HIDING GAMMA-MODIFICATION OF UNSUBSTITUTED LINEAR TRANSQUINACRIDONE

[75] Inventors: Ernst Spietschka, Idstein; Adolf Kroh, Selters, both of Fed. Rep. of Germany

[73] Assignee: Hoechst Aktiengesellschaft, Frankfurt am Main, Fed. Rep. of Germany

[21] Appl. No.: 930,981

[22] Filed: Nov. 13, 1986

Related U.S. Application Data

[63] Continuation of Ser. No. 662,179, Oct. 18, 1984, abandoned.

[30] Foreign Application Priority Data

Oct. 26, 1983 [DE] Fed. Rep. of Germany ....... 3338806

[51] Int. Cl.⁴ .............................................. C09B 48/00
[52] U.S. Cl. ..................................... 546/49; 106/504; 106/503; 106/497
[58] Field of Search ............................. 546/49, 56, 57

[56] References Cited

U.S. PATENT DOCUMENTS 2,821,529  1/1958  Struve ................................... 546/49
2,844,581  7/1958  Manger et al. ........................ 546/49
4,094,699  6/1978  Fitzgerald ........................ 546/49 X
4,247,695  1/1981  Fitzgerald ............................ 546/49
4,298,398  11/1981  Fitzgerald ....................... 546/49 X

FOREIGN PATENT DOCUMENTS 1184881  1/1965  Fed. Rep. of Germany ........ 546/49
1268586  5/1968  Fed. Rep. of Germany ........ 546/49
2152485  5/1973  Fed. Rep. of Germany ........ 546/49
3012181  10/1980  Fed. Rep. of Germany ........ 546/49
3338806  5/1985  Fed. Rep. of Germany ........ 546/49
1226825  8/1960  France .................................. 546/49
0027959  2/1984  Japan ................................... 546/49
0976553  11/1964  United Kingdom .................. 546/49
1002641  8/1965  United Kingdom .................. 546/49
1414116  11/1975  United Kingdom .................. 546/49
1413814  11/1975  United Kingdom .................. 546/49

OTHER PUBLICATIONS

Kuramoto, et al., Chemical Abstracts, vol. 92, 216,822s, (1980).

Primary Examiner—Donald G. Daus
Assistant Examiner—Diana G. Rivers

[57] ABSTRACT

A process for preparing the high-hiding form of the γ-crystal modification of unsubstituted linear transquinacridone having improved tinctorial strength and producing a coating of higher gloss, which comprises carrying out (a) the known cyclization of 2,5-diphenylaminoterephthalic acid in highly concentrated polyphosphoric acid or in acid polyphosphoric acid ester to the quinacridone and/or (b) the known hydrolysis of the quinacridone melt obtained in (a) and/or (c) the known aqueous alkali extraction of the quinacridone obtained in (b) and/or (d) the known finishing of the quinacridone obtained in (a) in the presence of 0.5 to 10 percent by weight, based on quinacridone, of surface-active agents.

15 Claims, No Drawings

PROCESS FOR PREPARING HIGH-HIDING GAMMA-MODIFICATION OF UNSUBSTITUTED LINEAR TRANSQUINACRIDONE

This case is a continuation of my copending application, Ser. No. 662,179 filed Oct. 18, 1984, now abandoned.

The invention relates to a process for preparing a high-hiding form of the γ-crystal modification of unsubstituted linear trans-quinacridone which has markedly improved application properties. Both the transparent and the high-hiding form of the γ-crystal modification of said quinacridone are very fast red pigments and as such are of considerable industrial importance for pigmenting finishes and paints and for coloring plastics.

The γ-crystal modification of unsubstituted linear trans-quinacridone can be prepared by various methods, for example, as in U.S. Pat. No. 2,844,581, by milling crystalline linear quinacridone (obtained for example as in U.S. Pat. No. 2,821,529 by cyclizing dialkyl 2,5-dianilino-3,6-dihydroterephthalate at 225°–300° C. in inert solvents and oxidizing the isolated dihydroquinacridone with mild oxidizing agents) with salt and treating the milled mixture with dimethylformamide. According to German Offenlegungsschrift No. 3,007,158, the γ-crystal modification of said quinacridone can be obtained in a pigmentary state by dry-milling highly crystalline γ-modification with small amounts of alum and aftertreating the mill base with dilute sulfuric acid, with or without added surface-active agents.

French Pat. No. 1,226,825 and Belgian Pat. No. 611,271 describe the preparation of linear quinacridone by cyclizing 2,5-dianilinoterephthalic acid in acid condensing agents. Suitable acid condensing agents are in particular polyphosphoric acid and its acid methyl esters. The highly agglomerated crude quinacridone obtained in these cyclization methods in the form of the insufficiently crystalline α-modification can be converted into the γ-modification, for example as described in German Pat. Nos. 1,268,586, 1,184,881 and 2,747,508 by treating it with alcohols at elevated temperatures after a prior alkali extraction or grinding the alcoholic suspension before heating it up.

To prepare the high-hiding form of the γ-modification by these methods, the cyclization takes place in 5 to 7.5 times the amount of highly concentrated polyphosphoric acid (85–86% of $P_2O_5$) or in an acid ester of polyphosphoric acid (83–85% $P_2O_5$). The crude quinacridone, which is in the form of the α-modification, is converted into the γ-modification as described in German Pat. Nos. 1,268,586 and 1,184,881. For the conversion into a highly crystalline γ-modification to be virtually quantitative it is essential that an alkaline treatment is carried out first. The high-hiding form of the γ-modification prepared by this process is suitable for use as a full-tone pigment and for cross-coloring inorganic and organic pigments, yet has very deficient gloss properties.

It has now been found that the high-hiding form of the γ-crystal modification of unsubstituted linear trans-quinacridone can be prepared so as to have improved tinctorial strength and produce a coating of higher gloss by carrying out (a) the known cyclization of 2,5-diphenylaminoterephthalic acid in highly concentrated polyphosphoric acid or in acid polyphosphoric acid ester to the quinacridone and/or (b) the known hydrolysis of the quinacridone melt obtained in (a) and/or (c) the known aqueous alkali extraction of the quinacridone obtained in (b) and/or (d) the known finishing of the quinacridone obtained in (a) to (c) in the presence of 0.5 to 10 percent by weight, based on quinacridone, of surface-active agents.

The surface-active agents can be cationic, anionic and nonionic agents.

Examples of cationic quaternary compounds in which the associated anions, such as, for example, halide, sulfate, alkoxysulfate and/or alkoxyphosphate ions, can vary with the method of preparing the cationic organic compounds are as follows: permethylated tallow-propylenediamine, stearyltrimethylammonium, dioctyldimethylammonium, distearyldimethylammonium, didecyldimethylammonium, cetyltrimethylammonium, benzylcocoalkyldimethylammonium, dicocoalkyldimethylammonium, cocoalkyl-2,4-dichlorobenzyldimethylammonium, stearylbenzyldimethylammonium, di-β-isopropoxycarbonylhexadecyldimethylammonium, permethylated N-stearoyldiethylenetriamine, permethylated N-stearoyltriethylenetetramine, laurylpyridinium, 2-hydroxy-5-chloro-1,3-xylylenebispyridinium, 2-hydroxy-5-isooctyl-1,3-xylylenebispyridinium, 2-hydroxy-5-t-butyl-1,3-xylylenebispyridinium, 2-hydroxy-5-n-nonyl-1,3-xylylenebispyridinium, 2-methoxy-5-isooctyl-1,3-xylylenebispyridinium, 2-hydroxy-5-isooctyl-1,3-xylylenebisisoquinolinium, 2-hydroxy-5-isooctyl-1,3-xylylenebisisoquinolinium, hexadecyltributylphosphonium, ethyltrioctylphosphonium and tetrabutylphosphonium.

Examples of anionic compounds are long-chain alkylsulfonates having 8–22 carbon atoms in the alkyl radical, alkyl (poly)glycol ether sulfates, such as, for example, lauryl diglycol ether sulfate, alkylarylsulfonates, such as, for example, dodecylbenzenesulfonic acid or its salts, alkylphenol (poly)glycol ether sulfates, such as, for example, tributylphenol polyglycol ether sulfate or nonylphenol polyglycol ether sulfate, alkyl sulfamidoacetates, such as, for example, Sinarol sulfamidoacetate, fatty acid taurides, such as, for example, cocoacid tauride, fatty acid N-methyltaurides, such as, for example, oleic acid N-methyltauride, fatty acid sarcosides, such as, for example, oleic acid or cocoacid sarcoside, salts of sulfosuccinates, such as, for example, the sodium or potassium salt of diisodecyl sulfosuccinate or lauryl sulfosuccinate, and/or resin acid derivatives, for example of the colophony type.

The nonionic compound which will be mentioned as an example thereof is a colophony derivative, namely dehydroabietylamine of the formula

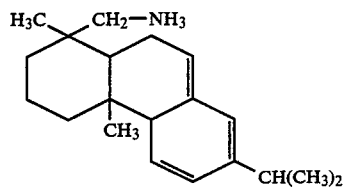

The steps, which are known per se, of cyclization to the quinacridone, hydrolysis, aqueous alkali extraction and finishing are preferably carried out as follows within the framework of the process according to the invention:

The cyclization of 2,5-diphenylaminoterephthalic acid in highly concentrated polyphosphoric acid or in acid methyl phosphate ($P_2O_5$ content 83–86%) to the quinacridone preferably takes place at temperatures of 100° to 150° C., in particular at 120°–130° C., in 4 to 4.5 times the weight of condensing agent.

The melt containing the reaction product is then poured for hydrolysis into 2.5 to 3 times the weight of water, preferably ice-water, and the crude quinacridone is isolated, preferably by filtration, and is washed with water until neutral.

The water-moist, approximately 15–25% strength crude quinacridone thus isolated is suspended in sufficient water that, after the addition of alkali, preferably potassium hydroxide or sodium hydroxide, the aqueous suspension contains 4 to 10%, preferably 5 to 7.5%, of pigment and 0.3 to 5%, preferably 0.5 to 2.5%, of alkali.

The suspension is then stirred at temperatures between 50° and 150° C., preferably 75° to 125° C., for several hours, if desired after prior wet-milling of the suspension by means of a wet-comminution machine, such as, for example, a toothed disk mill. The suspended particles are then filtered off and washed with water.

To finish the isolated water-moist quinacridone, which is still in the α-modification, and at the same time convert it into the γ-modification, it is suspended in solvents such as lower alcohols or ketones, and the suspension is stirred at temperatures between 100° and 170° C., preferably 125° to 150° C., for several hours. The solvent is then distilled off, and the pigment is isolated.

The surface-active agents according to the invention can be present in all four stages of the process (cyclization, hydrolysis, alkali extraction, and finishing); however, the improvement in pigment quality is much less if they are present only during the finishing. The presence during the cyclization is preferably ensured by first introducing the 2,5-diphenylaminoterephthalic acid into the condensing agent and then adding the surface-active agent. The surface-active agent is advantageously added at the hydrolysis stage in the form of a solution in the hydrolyzing water. The surface-active agent is added at the alkali extraction stage—the preferred procedure—most advantageously by first of all suspending the crude quinacridone in water, then adding the surface-active agent (dissolved or suspended in water) dropwise, and finally adding the alkali in the form of an aqueous solution.

The amount of the surface-active additive varies between 0.5 and 10 percent by weight and is preferably 0.5 to 5% by weight. Examples of preferred surface-active agents are cetyltrimethylammonium chloride, alkyl $C_{20}$–$C_{22}$-trimethylammonium chloride, dioctyldimethylammonium chloride, benzylstearyldimethylammonium chloride, didecyldimethylammonium chloride, stearyltrimethylammonium chloride, distearyldimethylammonium chloride, cocoalkyldimethylbenzylammonium chloride, dicocoalkyldimethylammonium chloride, dehydroabietylamine and acid derivatives of colophony, such as, for example, abietic acid.

A further advantage of the process according to the invention is that the acid condensing agent for the cyclization reaction can be cut to 4 to 4.5 times the amount, based on the amount of 2,5-diphenylaminoterephthalic acid used. Without additives at least five times the amount of cyclizing agent is necessary for the full-tone coating to be of comparable hiding power.

The pigments prepared by the process according to the invention represent high-hiding and highly crystalline forms of the pure γ-crystal modification of linear unsubstituted trans-quinacridone, have excellent application properties and produce coatings which, compared with the state of the art, are of markedly improved gloss and purity combined with increased tinctorial strength.

The same positive effect of improving the pigment properties can be achieved by suitably combining equivalent amounts of anionic and cationic surface-active agents. In this procedure, anionic assistants, in particular alkylarylsulfonates, such as, for example, dodecylbenzenesulfonate, alkylphenol polyglycol ether sulfates, such as tributylphenol polyglycol ether sulfate, and sulfosuccinates, such as, for example, diisodecyl sodium sulfosuccinate, can be present at the same time as the abovementioned cationic surface-active agents which are preferably used. These additives can be used in the same stage of the process or in succession in the various stages.

The process according to the invention is explained in more detail by the following illustrative embodiments. The parts and percentages are by weight.

EXAMPLE 1

100 parts of 2,5-dianilinoterephthalic acid are added with stirring at 100°–120° C. to 450 parts of polyphosphoric acid ($P_2O_5$ content 85.5%), the mixture is stirred at said temperature until the reaction has ended (which takes about 2 hours) and is then poured onto 1,350 parts of ice-water, and the hydrolysis suspension attains a temperature of 15°–20° C. After the hydrolysis has ended the precipitated crude quinacridone is filtered off and is washed with water until free of acid. The water-moist approximately 20–22% strength crude quinacridone thus obtained is suspended in 600 parts of water. A solution of 1.2 parts of dehydroabietylamine, 10.6 parts of water and 0.24 part of acetic acid is then added dropwise, and the mixture is stirred for 30 minutes. 150 parts of 10% strength aqueous potassium hydroxide solution are then added, and the mixture is bulked with water to a total of 1,500 parts. The suspension is then refluxed with stirring for 10 hours and is then filtered at 70°–80° C., and the filter cake is washed with water until neutral. The water-moist approximately 18–22% strength quinacridone thus isolated is suspended in 600 parts of 80% strength isobutanol, and the suspension is then stirred at 145°–150° C. in a sealed vessel for 5 hours. The isobutanol is then distilled off with steam, and the pigment is then filtered off, is washed with water and is dried at 80° C. The pigment yield is at least 96%.

The bluish red pigment prepared in this way is a highly crystalline γ-modification of linear trans-quinacridone. It is distinguished by excellent rheological properties. It produces high-hiding full-tone coatings of non-hazy bright color and really excellent gloss.

For comparison a pigment was prepared under identical conditions, except that no surface-active agent was present. The comparative full-tone coating is distinctly matter and has a milky haze. To compare the gloss properties, the furnace-baked full-tone films cast from 7% strength alkyd-melamine resin finishes on plastic sheet which were prepared under identical conditions and which, before the casting, had been adjusted with paint solvents to a 4 mm Ford cup viscosity of 22 seconds were measured at an angle of 20° with the D48D Hunterlab gloss meter. The following values were read off:

Pigment according to Example 1: 55.8
Comparative Example: 31.8

EXAMPLE 2

400 parts of the approximately 22% strength moist crude quinacridone obtained in Example 1 are dispersed in 600 parts of water. A solution of 2 parts of alkyl-$C_{20}$–$C_{22}$-trimethylammonium chloride (80% pure) in 80 parts of water is then added dropwise in the course of 15 minutes, and the mixture is stirred for 30 minutes. 80 parts of 15% strength sodium hydroxide solution are then added. After the suspension has been bulked with water to 1,500 parts it is milled for 5 minutes with an "Ultra Turrax" wet-comminuting machine and is then stirred at 125° C. in a sealed vessel for 5 hours. The quinacridone, after it has been isolated by filtration and washed until neutral, is then suspended in 100 parts of isobutanol and 500 parts of water, the suspension is stirred at 150° C. in a sealed vessel for 5 hours, and the quinacridone is finally isolated as described in Example 1. Linear trans-quinacridone is obtained in a yield of more than 96% of theory in the form of a highly crystalline γ-modification. The gloss of the high-hiding, pure, red, non-hazy full-tone coating on plastic film, as described in Example 1, was measured as 57.8.

EXAMPLE 3

225 parts of polyphosphoric acid ($P_2O_5$ content 85.5%) are heated to 50° C. 3.75 parts of methanol are then added dropwise in the course of 10 minutes. After stirring for 30 minutes the mixture is raised to 100° C. and is stirred at this temperature for 2 hours. It is then raised to 120° C. On reaching this temperature 50 parts of 2,5-dianilinoterephthalic acid are added with stirring in the course of 1 hour. After the mixture has been stirred at 120° C. for a further hour 1 part of distearyldimethylammonium chloride is added, and the mixture is stirred at 120° C. for a further hour. The melt is then hydrolyzed with 300 parts of ice and 375 parts of water. The crude quinacridone is separated off by filtration and is washed with water until neutral. The water-moist crude quinacridone is suspended in 300 parts of water and 75 parts of 10% strength potassium hydroxide solution are added. The suspension thus obtained is bulked to 750 parts with water and is then boiled with stirring for 7 hours. The suspended particles are then filtered off and washed with water until neutral. The isolated neutral moist quinacridone is suspended in 300 parts of 80% strength isobutanol, the suspension is stirred at 150° C. in a sealed vessel for 5 hours, and the quinacridone is then isolated as described in Example 1. Drying produces 44.5 parts of bluish red pigment of the pure γ-crystal modification. To measure the gloss, a casting was prepared on plastic film and measured, both steps being carried out as described in Example 1. The gloss value is 52.1.

EXAMPLE 4

50 parts of 2,5-dianilinoterephthalic acid are added with stirring at 125° C. to 225 parts of acid methyl polyphosphate ($P_2O_5$ content about 83%) in the course of 1 hour, and the mixture is stirred at said temperature for 2 hours. The cyclization melt is hydrolyzed by means of 300 parts of ice and 375 parts of water. The quinacridone formed is filtered off and is washed with water until neutral. The water-moist approximately 22% strength quinacridone is suspended in 400 parts of water. 18 parts of a 5% strength aqueous cetyltrimethylammonium chloride solution are added dropwise with stirring in the course of 10 minutes. After 30 minutes of stirring 75 parts of 10% strength potassium hydroxide solution are added, and the suspension is bulked to 750 parts with water. The suspension, possibly after a wet milling, is then stirred at 100° C. for 10 hours. It is then filtered and the filter cake is washed with water until neutral. The isolated water-moist approximately 18–22% strength quinacridone is suspended in 300 parts of 80% strength isobutanol, and the suspension is stirred at 145° C. in a sealed vessel for 5 hours. The isobutanol is separated off by steam distillation, and the bluish red pigment is isolated by filtration. The pigment obtained after drying in a yield of above 96% of theory produces when used in paint systems high-hiding, non-hazy, brilliant full-tone coatings of excellent gloss. The gloss value measured as described in Example 1 is 59.5.

EXAMPLE 5

200 parts of the approximately 22% strength crude quinacridone obtained as in Example 4 are suspended in 400 parts of water. A solution of 3 parts of 30% strength cetyltrimethylammonium chloride in 15 g of water is added dropwise with stirring in the course of 10 minutes. After 10 minutes of stirring a solution of 4 parts of 50% strength tributylphenol polyglycol ether (7–9) sulfate in 30 parts of water is added dropwise in the course of 10 minutes. After 20 minutes of stirring 100 g of 7.5% strength sodium hydroxide solution are added dropwise. This is followed by 10 hours of refluxing. The quinacridone, after it has been isolated by filtration and washed until neutral, is finished with butanol as described in Example 4. Drying produces 45.2 parts of linear transquinacridone in the pure γ-modification. The gloss value of the casting on a plastic film is 53.5.

EXAMPLE 6

200 parts of the water-moist 22% strength crude quinacridone obtained in Example 4 are suspended in 400 parts of water. 10 parts of an aqueous 10% strength solution of dehydroabietylamine, rendered weakly acid by means of acetic acid, are added dropwise in the course of 10 minutes. After 10 minutes of stirring 100 parts of 7.5% strength potassium hydroxide solution are added. The suspension is then milled in an Ultra-Turrax for 5 minutes and is then boiled with stirring for 5 hours. The suspended particles are then filtered off and washed until neutral. The neutral water-moist quinacridone is suspended in 300 g of 80% strength isobutanol. 3 parts of 65% strength diisodecyl sodium sulfosuccinate in 40 parts of water are then added dropwise. The mixture is then heated to 150° C. and is held at that temperature for 5 hours. The pigment is isolated as described in Example 1. The yield is above 96% of theory. The gloss value of the high-hiding full-tone coating cast onto plastic film is 54.0.

We claim:

1. In a process for preparing the high-hiding form of the γ-crystal modification of unsubstituted linear transquinacridone having improved tinctorial strength and producing a coating of higher gloss, which process includes (a) cyclizing 2,5-diphenylaminoterephthalic acid, in highly concentrated polyphosphoric acid or in acid polyphosphoric acid ester, to obtain essentially the quinacridone in its α-modification; (b) hydrolyzing the resulting quinacridone melt obtained in step (a); (c) extracting the quinacridone obtained in step (b) with aqueous alkali, and (d) finishing the thus-isolated quinacridone, the improvement which comprises the further step of providing the presence of 0.5 to 10 percent by weight, based on the weight of the quinacridone, of a surface-active agent component during at least one of said steps (a), (b), (c), and (d), said surface-active agent component being a cationic quaternary ammonium compound; a cationic quaternary phosphonium compound; a nonionic colphony derivative; or combinations of said cationic compounds and nonionic compounds; provided, that if a said surface active component is present during said step (d), the same or a different one of said surface active components is present during at least one other of the remaining three steps (a), (b) or (c).

2. A process as claimed in claim 1, wherein said combinations of the surface active agents are, in addition to combinations of said cationic quaternary ammonium compounds with each other or nonionic colophony derivatives with each other:

dehydroabietylamine or its salt with a nonionic surface active agent.

3. A process as claimed in claim 1, wherein said cationic quaternary ammonium compound or cationic quaternary phosphonium compound is permethylated tallow-propylenediamine, stearyltrimethylammonium, alkyl-$C_{20}$-$C_{22}$-trimethylammonium, dioctyldimethylammonium, distearyldimethylammonium, didecyldimethylammonium, cetyltrimethylammonium, benzylcocoalkyldimethylammonium, di-cocoalkyldimethylammonium, cocoalkyl-2,4-dichlorobenzyldimethylammonium, stearylbenzyldimethylammonium, di-$\beta$-isopropoxycarbonylhexadecyldimethylammonium, permethylated N-stearoyldiethylenetriamine, permethylated N-stearoyltriethylenetetramine, laurylpyridinium, 2-hydroxy-5-chloro-1,3-xylylenebispyridinium, 2-hydroxy-5-isooctyl-1,3-xylylenebispyridinium, 2-hydroxy-5-t-butyl-1,3-xylylenebispyridinium, 2-hydroxy-5-n-nonyl-1,3-xylylenebispyridinium, 2-methoxy-5-isooctyl-1,3-xylylenebispyridinium, 2-hydroxy-5-isooctyl-1,3-xylylenebisquinolinium, 2-hydroxy-5-isooctyl-1,3-xylylenebisisoquinolinium, hexadecyltributylphosphonium, ethyltrioctylphosphonium and/or tetrabutylphosphonium, or combinations thereof, in which the associated anion can vary.

4. The process as claimed in claim 1, wherein the nonionic colophony derivative is dehydroabietylamine.

5. A process as claimed in claim 1, wherein the cationic quaternary ammonium compound is a halide.

6. A process as claimed in claim 1, wherein the surface active agent component is:

(1) at least one said cationic quaternary ammonium compound, or (2) dehydroabietylamine or its salt, or (3) dehydroabietylamine and a nonionic surface-active agent.

7. A process as claimed in claim 6, wherein the surface active agent component is cetyltrimethylammonium chloride, alkyl $C_{20}$-$C_{22}$-trimethylammonium chloride, dioctyldimethylammonium chloride, benzylstearyldimethylammonium chloride, didecyldimethylammonium chloride, stearyltrimethylammonium chloride, distearyldimethylammonium chloride, cocoalkyldimethylbenzylammonium chloride, dicocoalkyldimethylammonium chloride, dehydroabietylamine, an acid derivative of colophony, or combinations thereof.

8. A process as claimed in claim 1, wherein the surface active agent component is present during all four of said steps (a), (b), (c), and (d).

9. A process as claimed in claim 1, wherein a said surface-active agent component is added during said step (b) in the form of a solution in the hydrolyzing water.

10. A process as claimed in claim 1, wherein a said surface-active agent component is present in the aqueous alkaline extracting medium during said step (c).

11. A process as claimed in claim 10, wherein the same or a different one of said surface-active agent components is additionally present during said step (d).

12. A process as claimed in claim 1, wherein a said surface-active agent component is present at least during said step (a).

13. In a process for preparing the high-hiding form of the $\gamma$-crystal modification of unsubstituted linear transquinacridone having improved tinctorial strength and producing a coating of higher gloss, which process includes (a) cyclizing 2,5-diphenylaminoterephthalic acid, in highly concentrated polyphosphoric acid or in acid polyphosphoric acid ester, to obtain essentially the quinacridone in its $\alpha$-modification; (b) hydrolyzing the resulting quinacridone melt obtained in step (a); (c) extracting the quinacridone obtained in step (b) with aqueous alkali, and (d) finishing the thus-isolated quinacridone, the improvement which comprises the further step of providing the presence of 0.5 to 10 percent by weight, based on the weight of the quinacridone, of a surface-active agent component during at least one of said steps (a), (b), (c), and (d), said surface-active agent component being a combination of a cationic quaternary ammonium or phosphonium compound with an anionic sulfonate salt, sulfate salt, sulfamide-acetate salt, fatty acid tauride or sarcoside salt, sulfosuccinate salt, or resin derivative, the cationic quaternary ammonium or phosphonium compound and the anionic salt being added together during the same step or in succession in different steps.

14. A process as claimed in claim 1, wherein a said surface-active component is present during at least said step (b).

15. A process as claimed in claim 1, wherein a said surface-active agent is present during all of steps (a) through (d).

* * * * *